United States Patent [19]
Folci

[11] Patent Number: 5,445,056
[45] Date of Patent: Aug. 29, 1995

[54] SAW

[75] Inventor: Giovanni A. Folci, Briosco, Italy

[73] Assignee: Black & Decker Inc., Newark, Del.

[21] Appl. No.: 390,155

[22] Filed: Feb. 16, 1995

Related U.S. Application Data

[63] Continuation of Ser. No. 161,732, Dec. 2, 1993, abandoned.

[30] Foreign Application Priority Data

Dec. 4, 1992 [GB] United Kingdom ............... 9225441

[51] Int. Cl.6 ........................................... B26D 7/06
[52] U.S. Cl. ...................................... 83/100; 30/124; 30/391; 83/421.3; 83/581
[58] Field of Search ............... 30/124, 390, 391, 393, 30/394; 83/100, 471.3, 477.2, 574, 381

[56] References Cited

U.S. PATENT DOCUMENTS

| | | | |
|---|---|---|---|
| 2,839,102 | 6/1958 | Kido | 83/100 |
| 3,882,598 | 5/1975 | Earle et al. | 30/390 |
| 3,998,121 | 12/1976 | Bennett | |
| 4,675,999 | 6/1987 | Ito et al. | 30/390 X |
| 4,934,233 | 6/1990 | Brundage et al. | |
| 5,012,583 | 5/1991 | Blöchle et al. | 30/124 X |
| 5,129,300 | 7/1992 | Kawakami | 30/391 X |

FOREIGN PATENT DOCUMENTS

| | | |
|---|---|---|
| 0133666 | 3/1985 | European Pat. Off. |
| 0242733 | 10/1987 | European Pat. Off. |
| 2467670 | 4/1981 | France |

OTHER PUBLICATIONS

Catalog description of Applicant's DeWalt 1707 Crosscutter Compound Miter Saw; published 1987.

Primary Examiner—Douglas D. Watts
Attorney, Agent, or Firm—Charles E. Yocum; Dennis A. Dearing; Frederick H. Voss

[57] ABSTRACT

A chop saw comprising a base table (1, 3), a pivot block (11) attached to the base table (3), a pivot member (21) mounted on the pivot block (11) for relative motion therebetween and a saw blade (15) mounted on the pivot member (21) for movement towards and away from the base table (1, 3) to cut a workpiece positioned on the base table (1, 3), wherein a dust extraction passage (74, 75, 76) for enabling a suction apparatus to extract dust from the base table (1, 3) passes through the pivot block (11) and the pivot member (21). Such an arrangement is neat and compact, and yet provides an efficient dust removal facility.

15 Claims, 5 Drawing Sheets

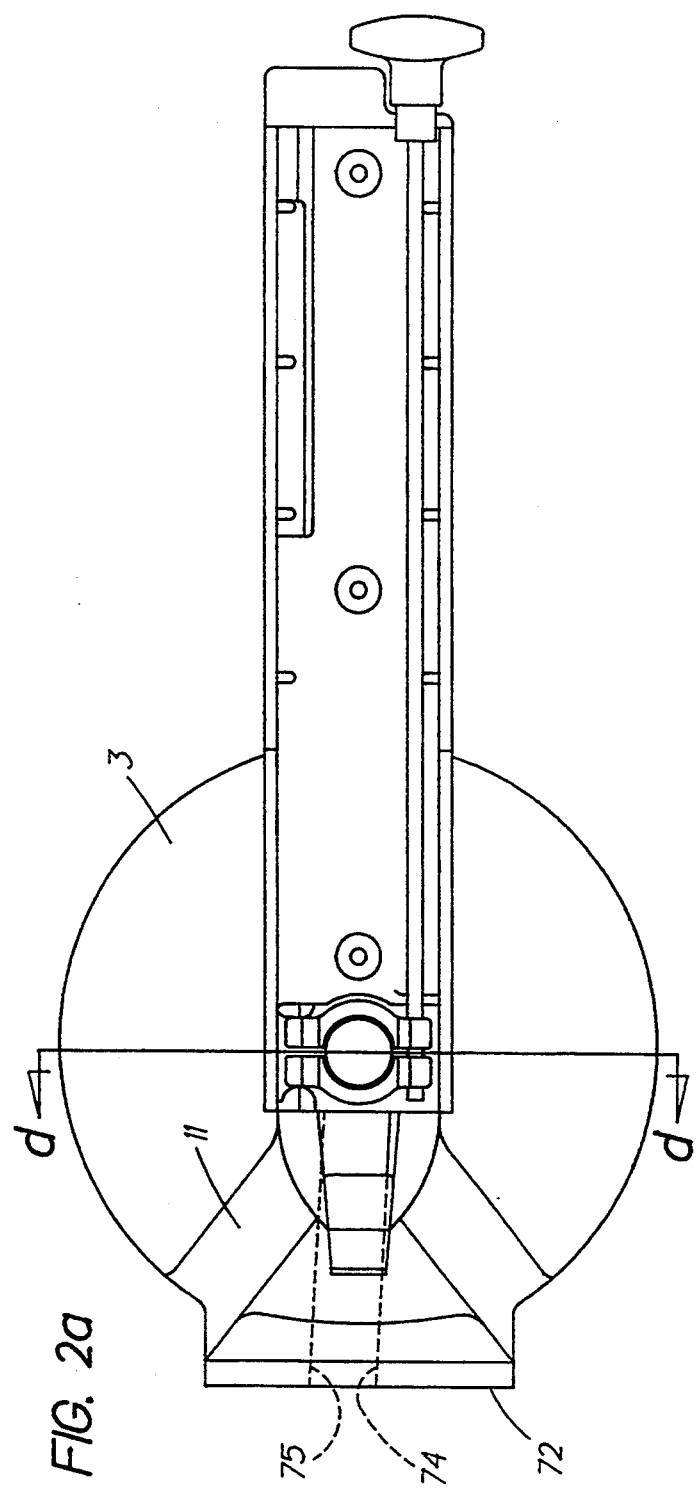
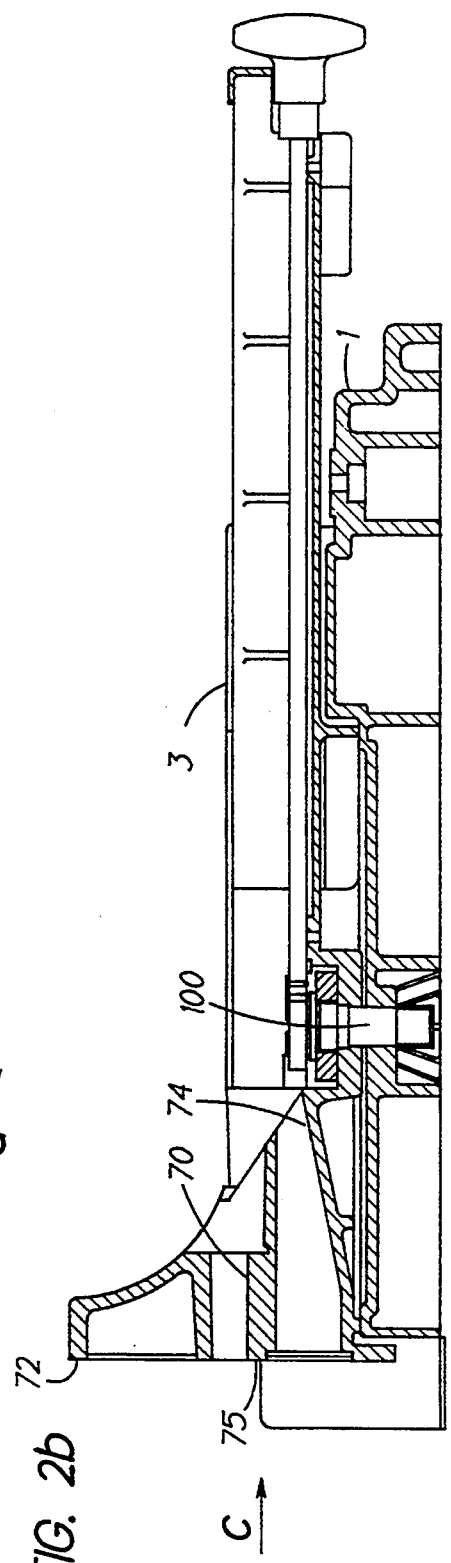
FIG. 2a
FIG. 2b

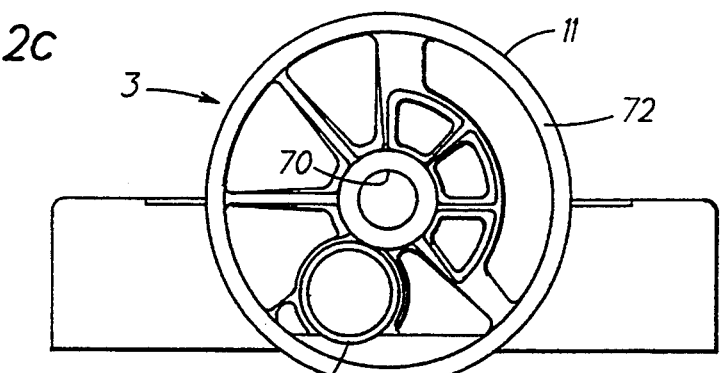
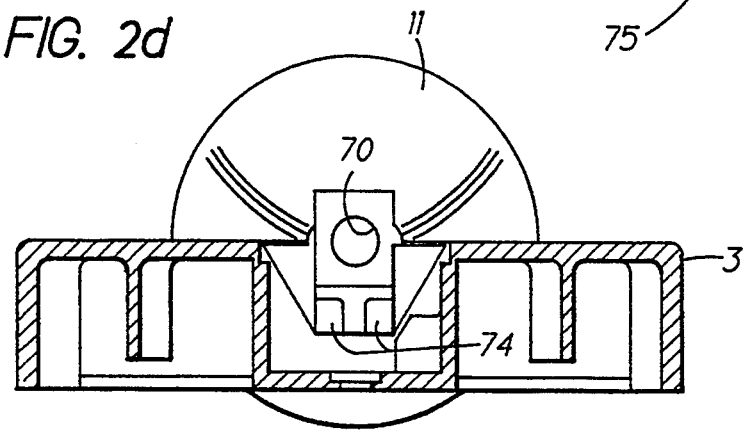
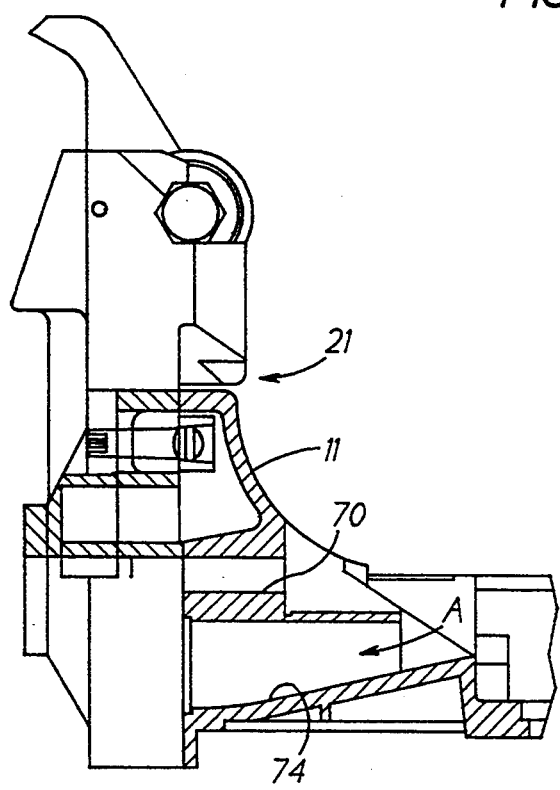
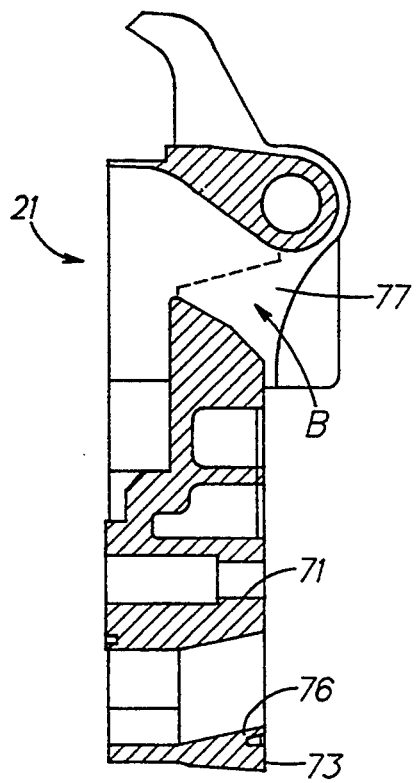

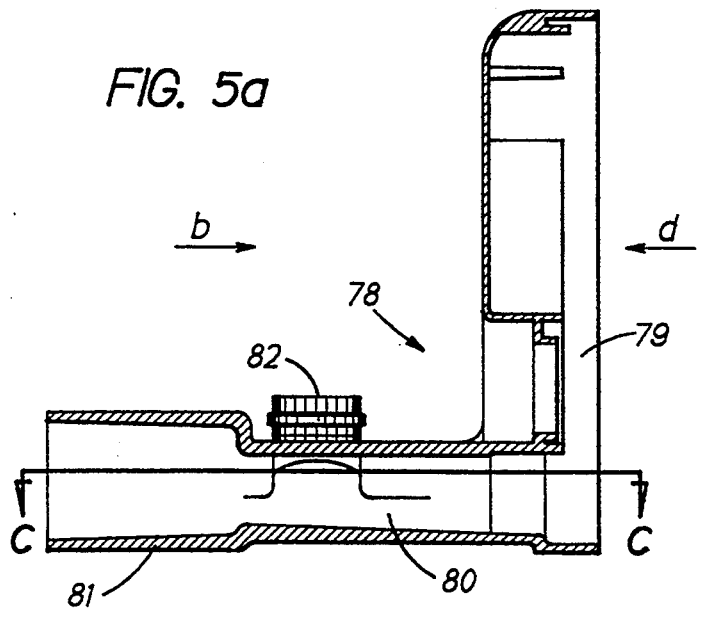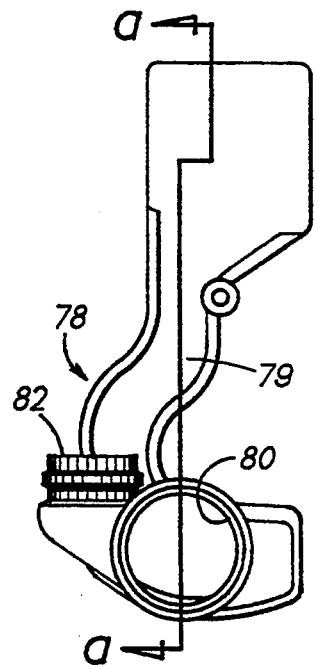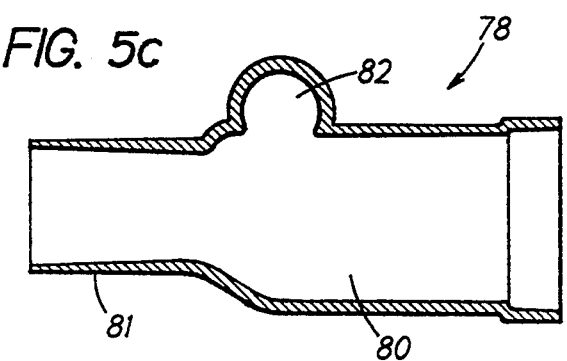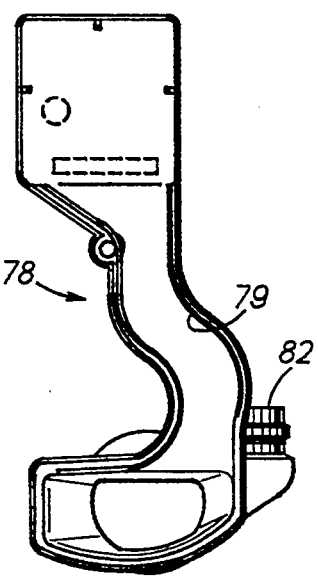

SAW

This application is a continuation of application Ser. No. 08/161,732, filed Dec. 2, 1993, now abandoned.

BACKGROUND OF THE INVENTION

This invention relates to saws, and in particular to a chop saw having a novel dust extraction arrangement.

Chop saws, which enable bevel and/or mitre cuts to be made to a workpiece, are well known. Such saws include a support table in which is rotatably received a round saw table having an extension arm received in a segmental recess of the support table. On the back of the round saw table is mounted a pivot block to which a pivot member is pivotally mounted for rotation about an axis substantially parallel to the extension arm. A rod block on the pivot member is pivoted about an axis which is perpendicular to the axis of rotation of the pivot member. The rod block has two rods on which are slidably received a motor and a blade housing for receiving a saw blade.

The round saw table and extension arm include a slot into which a saw blade driven by the motor is plunged after cutting a workpiece received against a guide fence fixed to the support table. Plunging of the saw blade is effected by pivoting of the blade housing about the rod block pivot axis. Bevel cuts can be made by first pivoting the pivot member with respect to the pivot block. Mitre cuts can be made by first rotating the round saw table with respect to the fixed support table and fence. Longer cuts can be made by sliding the motor housing and saw blade along the rods. Such a saw is described in EP-A-0242733 and EP-A-0133666.

When a cut has been made by the saw blade in a workpiece, dust is produced which is preferably removed by means of a suction device. With this in mind, it is known for an open end of a dust extraction passage to be adjacent the support table to enable dust to be sucked from the support table to a collection point away from the support table. However, prior art suction devices have tended to be large in volume and unsightly. When the ducting or dust extraction passages have been encased in the framework of the complete saw device, the end result has been a significant increase in the size of the device.

SUMMARY OF THE INVENTION

In view of the foregoing, the present invention aims to provide a compact saw device, which includes a compact, efficient and reliable dust extraction system.

According to the present invention, there is provided a saw comprising a base table, a pivot block of the base table, a pivot member pivoted to the pivot block about a bevel axis lying parallel the plane of the base table, a motor driven saw blade mounted on the pivot member and adapted to cut workpieces positioned on the base table, and a dust extraction passage adapted for connection to suction apparatus for the removal of dust generated during sawing operations., wherein a first part of said dust extraction passage is formed in said pivot block and a second part is formed in said pivot member and communicating with said first part.

By providing the dust extraction passage in two parts through the pivot block and pivot member, a much more compact saw can be produced because ducting under or around the pivot block and pivot member is no longer required. This effect is especially beneficial when the mating faces of the pivot block and pivot members are cylindrical having a large diameter which is much preferred in order to ensure accurate alignment between these components in any bevel position.

Preferably the base table includes a recess or slot into which the saw blade plunges, during use, the dust extraction passage having an entrance in the pivot block in said recess. The open end of the passage may, however, be positioned facing any area of the chop saw from which it is desirable to remove dust or debris.

The first part of the dust extraction passage may have an exit, facing the pivot member, which is off-line with respect to the bevel axis. If this is the case, the second part of the dust extraction passage is preferably elongate such that, when the pivot member and pivot block move relative to each other, the exit of the first part is always in communication with the elongate opening of the second part.

The elongate opening is preferably elongate in a circumferential direction with respect to the bevel axis.

A second dust extraction passage may pass through the pivot member. Such a second dust extraction passage preferably includes an entrance facing an upper surface of the base table.

The saw preferably also includes a dust collector for receiving dust from both the first and the second dust extraction passages and for directing the dust towards a suction apparatus. Such a dust collector is, in use, preferably attached to the pivot member and includes a rearwardly extending exit duct.

The rearwardly extending exit duct of the dust collector preferably includes a branch entry for communicating with a third dust extraction passage arranged to extract dust from an area adjacent the saw blade. The branch entry could, however, be used to receive dust from any other area of the saw, as required.

Alternatively, all three passages may have separate ducts leading to a manifold for connection to said suction apparatus.

In a preferred embodiment of chop saw according to the present invention, a rod block for supporting rods is arranged, preferably pivotable on the pivot member and the saw blade is mounted on the rods of the rod block. Furthermore, the saw blade is preferably driven by a motor mounted on the rods of the rod block, although any other appropriate form of drive means could also be used. The motor and saw blade may be slidable on the rods. Clearly, however, other alternative arrangements are feasible: the rods may slide in the rod block; and/or the motor and saw blade may be pivotable with respect to the rods.

BRIEF INTRODUCTION TO THE DRAWINGS

A specific embodiment of the present invention is now described, by way of example, with reference to the accompanying drawings, in which:

FIG. 1 is a side view of a saw according to the present invention;

FIGS. 2a and b are a plan view and side section respectively of the rotatable table of the saw of FIG. 1;

FIGS. 2c and d are an end view (arrow c in FIG. 2b) and a section on the line d—d in FIG. 2a, respectively, of the table of FIGS. 2a and b;

FIGS. 3a and b are a side view and side section (on the line III—III in FIG. 4c) respectively of the pivot member of the saw;

FIGS. 4a to d are a back view, left side view (arrow b in FIG. 4a), front view and right side view (arrow d in FIG. 4a) respectively of the pivot member of FIG. 3; and FIGS. 5a to d are a side section (on the line a—a of FIG. 5b), back view, section on the line c—c in FIG. 5a and front view, respectively, of a dust collector for the saw.

DETAILED DESCRIPTION OF THE PREFERRED EMBODIMENTS.

Figure 1:
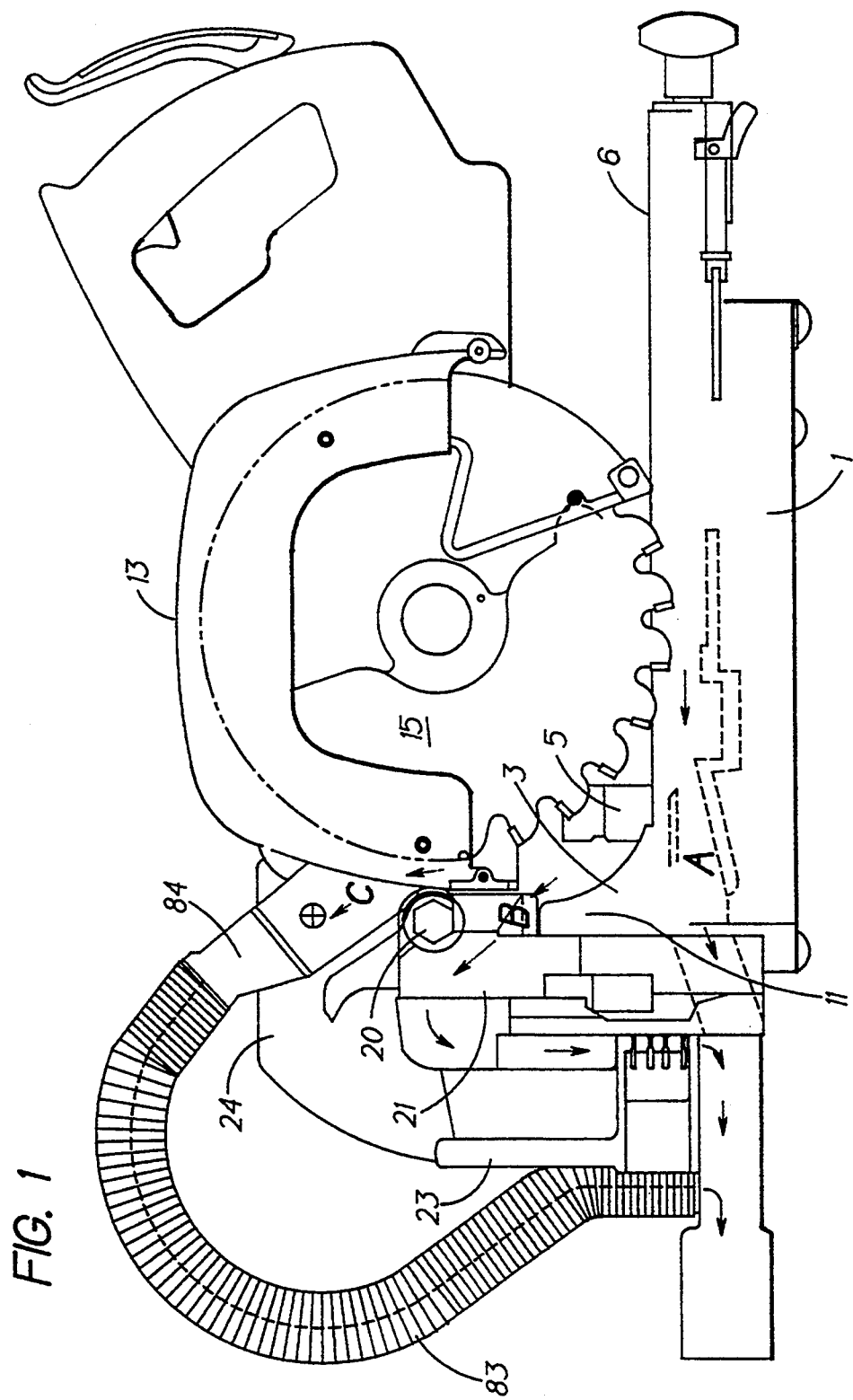
Figure 4A:
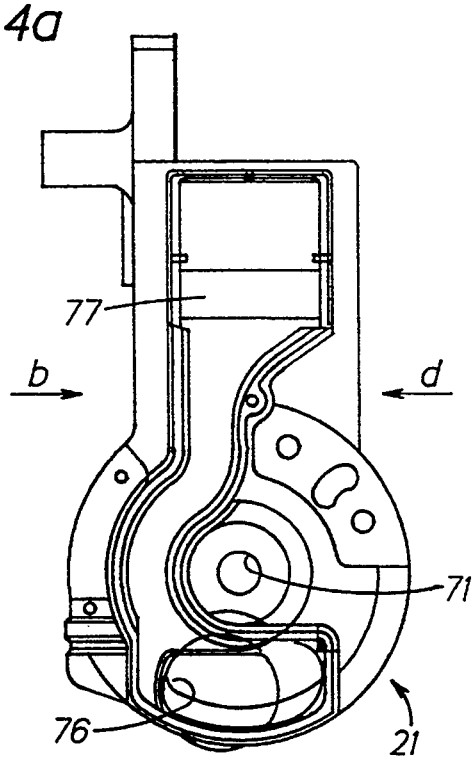
Figure 4B:
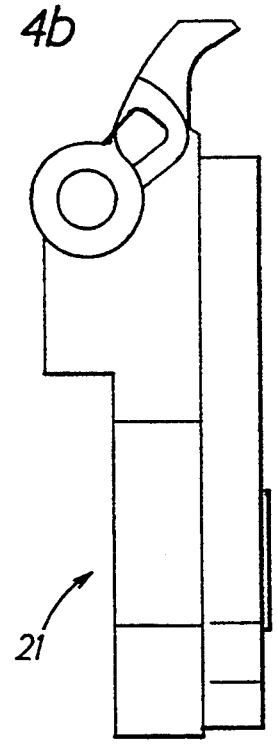
Figure 4C:
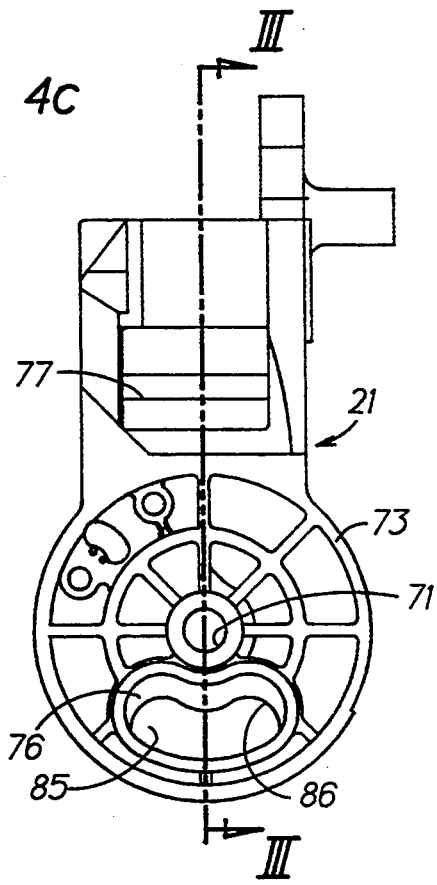
Figure 4D:
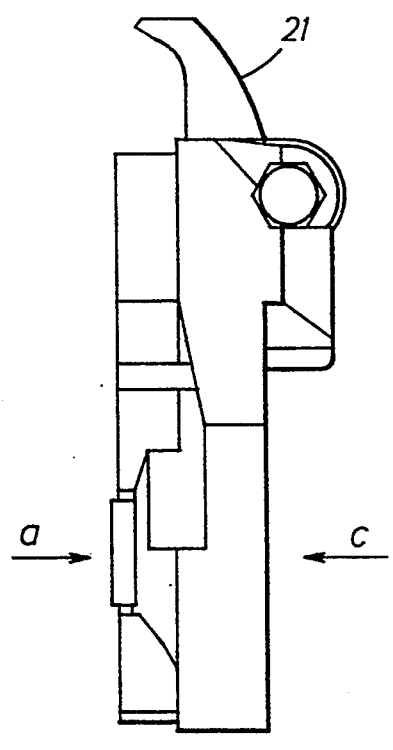

With reference to the drawings, a saw according to the present invention includes a support table 1 in which is rotatably received a roared base table 3 having an extension arm 6 received in a segmental recess of the support table 1.

On the back of the round saw table 3 is mounted a pivot block 11 to which a pivot member 21 is pivotally mounted for rotation about a bevel axis arranged parallel to the extension arm 6. On the pivot member 21 is pivoted a rod block 24 about an axis 20 which is perpendicular to the axis of rotation of the pivot member 21. The rod block 24 has two rods (not shown) on which a motor and blade housing 13 are slidably received.

The round saw table 3 and extension arm 6 have a slot (not shown) into which a saw blade 15 driven by the motor is plunged after cutting workpieces received against a guide fence 5 fixed to the support table 1. Plunging of the saw blade 15 is effected by pivoting of the blade housing 13 about axis 20. Bevel cuts can be made by first pivoting the pivot member 21 with respect to the pivot block 11. Mitre cuts can be made by first rotating the table 3 with respect to the fixed support table 1 and fence 5. Longer cuts can be made by sliding the motor housing 13 along the rods (not shown) away from the rod block 24.

Dust extraction is effected through three passages or routes A, B, C, communicating with a suction device (not shown). During use, dust is attracted to the various passages or routes A, B, C depending on the position of the saw blade 15 with respect to them and the workpiece (not shown) being cut.

The arrows in FIG. 1 show the dust extraction passages or routes A, B, C. Route A is through the base of the round table 3 and comes into operation when the workpiece is fully penetrated by the blade 15, i.e. when it is in the position shown in FIG. 1. Route B is above the work table but outside the blade housing 13; it is used primarily before full penetration of the workpiece when the blade 15 is close to the pivot member 21. Route C is through the blade housing 13 and is used in all positions, and primarily when the housing 13 is moved along the rods away from the pivot member 21.

Turning to FIGS. 2a to d, the rotatable table 3 is mounted on the fixed support table 1 through a pivot pin 100 enabling the rotatable table 3 to be turned to different mitre positions about a vertical axis concentric with the pin 100.

At the back of the rotatable table 3 is formed the pivot block 11 which comprises a central bore 70 and a surrounding cylindrical flange 72. The pivot member 21 (see also FIGS. 3 and 4) likewise has a central bore 71 and a surrounding cylindrical flange 73. A bolt, terminating in a knob 23, connects the two parts, passing through the bores 70, 71, and constitutes the above-referred to bevel axis lying parallel the extension arm 6.

Directly under the bore 70, a passage 74 is formed passing through the pivot block 11 and connecting the trough or slot in the extension 6 with the pivot member 21. However, the passage 74 is not in line with the slot of the extension 6 but is oblique, opening at 75 in the back of the pivot block 11 to one side of the entre line thereof. The edge of the opening 75 is flush with the flange 72.

The pivot member 21 has a corresponding passage 76, opening from its front face flush with the flange 73 and opening at the rear.

The pivot block 11 acts also as a ramp up to an opening 77 in the pivot member 21, which forms a further passage through the pivot member 21 and constitutes the opening of route B (i.e. the second dust extraction passage).

A dust collector 78, shown in FIGS. 5a to d, comprises essentially a channel section 79 which, when fired to the rear of the pivot member 21, connects the two passages 76 and 77 together. The collector 78 also comprises a tube 80 extending from the channel section 79 terminating in a vacuum extraction port 81 for connection to a vacuum extraction system (not shown). A branch entry 82 is for a flexible hose 83 (see FIG. 1) which connects with an exit 84 for dust route C from the blade housing 13.

Returning to FIG. 4c, it is to be noted that passage 76 is elongate in a circumferential direction with respect to bore 71. Bore 71 is the pivot axis of the pivot member 21 with respect to the pivot block 11. When flanges 72 and 73 mate, the centre of the rear opening 75 in the pivot block 11 is coincident with point 85 in the passage 76. In this position the right half of the lip of opening 75 is coincident with the left part of the lip of passage 76. When the pivot member 21 is pivoted through as much as 48°, the centre of opening 75 becomes coincident with point 86. In other words, the passages 74, 76 remain in communication despite the pivoting of the pivot member 21 with respect to the pivot block 11.

As will be appreciated from the foregoing, a dust extraction system arranged as herein described is particularly compact and yet provides efficient extraction of dust from the work area of the chop saw, particularly in respect of dust extracted from the slot 6 which otherwise must pass under the pivot member 21 and so increasing the necessary depth of the table 1.

It will of course be understood that the present invention has been described above purely by way of example, and that modifications of detail can be made within the scope of the invention. In this respect it has been found that even better dust extraction can be achieved by dispensing with the dust collector 78 and instead connecting a tube, such as the tube 83 to the exit of each passage A,B and connecting these two tubes with the tube 83 in a manifold for connection to the suction apparatus so that better air flow characteristic in each passage A,B,C can be achieved.

I claim::

1. A saw comprising a base table, a pivot block on the base table, a pivot member pivoted to the pivot block about a bevel axis lying parallel to the plane of the base table, a motor driven saw blade mounted on the pivot member and adapted to cut workpieces positioned on the base table, a dust extraction passage adapted for connection to suction apparatus for the removal of dust generated during sawing operations, wherein a first part of said dust extraction passage is formed in said pivot block and a second part is formed in said pivot member and communicating with said first part.

2. A saw as claimed in claim 1, wherein the base table includes a recess into which the saw blade plunges, during use, the dust extraction passage having an entrance in the pivot block in said recess.

3. A saw as claimed in claim 2, wherein said first part of the dust extraction passage has an exit, facing the pivot member, which is off-line with respect to said bevel axis.

4. A saw as claimed in claim 3, wherein said second part of the dust extraction passage is elongate, such that, when the pivot member and pivot block move relative to each other, the exit of the first part is always in communication with the second part.

5. A saw as claimed in claim 4, wherein the second part is elongate in a circumferential direction with respect to the bevel axis of the pivot member.

6. A saw as claimed in claim 1, wherein a second dust extraction passage passes through the pivot member.

7. A saw as claimed in claim 6, wherein the second dust extraction passage has an entrance facing an upper surface of the base table.

8. A saw as claimed in claim 6, further comprising a dust collector for receiving dust from both the first and second dust extraction passages and for directing the dust towards a suction apparatus.

9. A saw as claimed in claim 8, wherein the dust collector, in use, is attached to the pivot member and includes a rearwardly extending exit duct.

10. A saw as claimed in claim 9, wherein the rearwardly extending exit duct includes a branch entry for communicating with a third dust extraction passage arranged to extract dust from an area adjacent the saw blade.

11. A saw as claimed in claim 1, wherein a rod block for supporting rods is mounted on the pivot member and the saw blade is mounted on the rods of the rod block.

12. A saw as claimed in claim 11, wherein the rod block is pivotable on the pivot member about a pivot axis lying parallel said plane and perpendicular the bevel axis.

13. A saw as claimed in claim 11, wherein the saw blade is driven by a motor mounted on the rods of the rod block.

14. A saw as claimed in claim 13, wherein the motor and saw blade are slidable on the rods of the rod block.

15. A saw as claimed in claim 1 wherein said pivot block and pivot member have mating annular faces concentric with said bevel axis and said first and second parts are between said faces and bevel axis.

* * * * *